United States Patent [19]
O'Dea

[11] 3,754,737

[45] Aug. 28, 1973

[54] DIRECT GEAR DRIVE FOR TRUCK MIXER DRUM

[75] Inventor: John A. O'Dea, Columbus, Ohio

[73] Assignee: The Jaeger Machine Company, Columbus, Ohio

[22] Filed: Feb. 1, 1972

[21] Appl. No.: 222,585

[52] U.S. Cl. ............................................ 259/177 A
[51] Int. Cl. ............................................... B28c 5/18
[58] Field of Search ..................... 259/177 R, 177 A, 259/176, 175, 81, 3, 14, 30; 68/140

[56] References Cited
UNITED STATES PATENTS

| | | | |
|---|---|---|---|
| 2,506,280 | 5/1950 | Ryder | 68/140 |
| 838,661 | 12/1906 | Stadtmuller | 259/81 R |
| 3,080,152 | 3/1963 | Lendved | 259/177 R |
| 3,424,440 | 1/1969 | Upham | 259/177 R |

*Primary Examiner*—Robert W. Jenkins
*Attorney*—William V. Miller et al.

[57] ABSTRACT

A direct gear drive for a mixer or agitator of the type in which the drum is mounted for rotation on a transporting vehicle, usually a truck. The power unit may be a hydraulic motor mounted directly behind the cab of the truck and the present invention provides a direct gear drive between that motor and the rotatable drum. This gear drive is in the form of a transmission of the planetary gear type, and, according to this invention, part of the transmission is disposed within the adjacent end of the drum itself, along with means for adequately protecting it from the contents of the drum, or in an exterior space recessed within the contour of the end of the drum.

16 Claims, 4 Drawing Figures

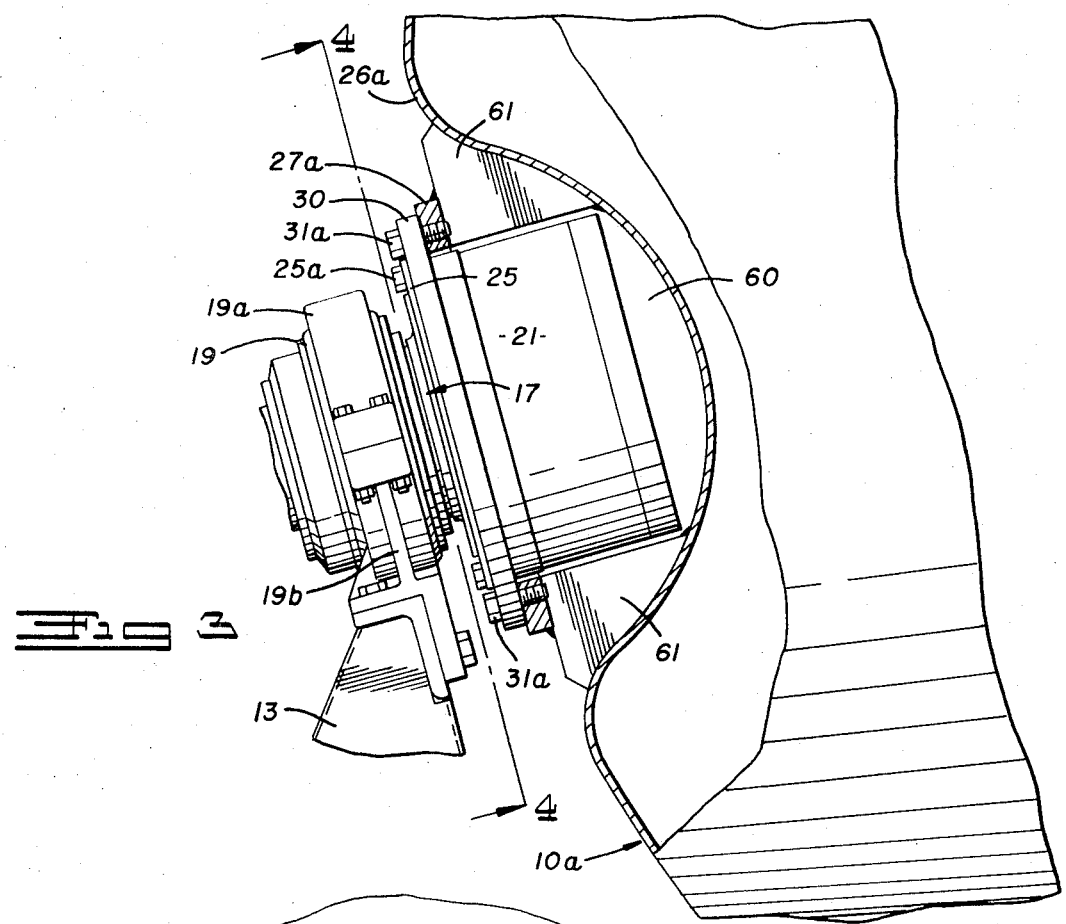
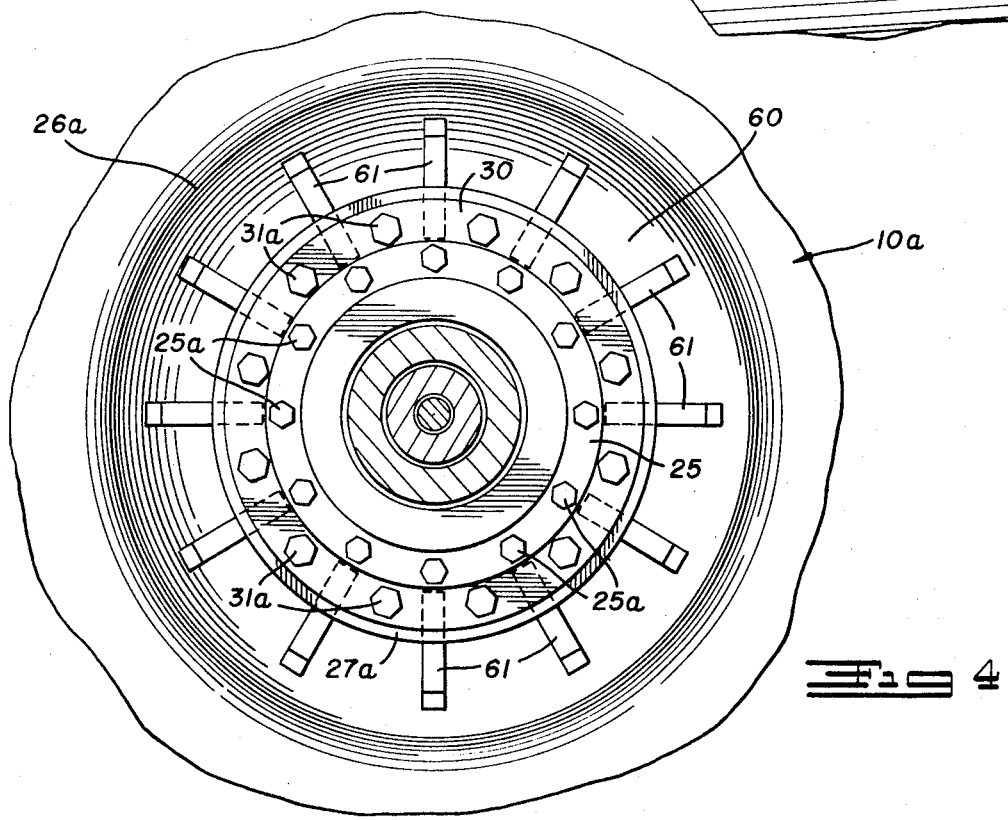

DIRECT GEAR DRIVE FOR TRUCK MIXER DRUM

This invention deals with vehicle-mounted mixers or agitators commonly known as truck mixers. The most common type of truck mixer in use consists of a drum rotatably mounted on a truck as closely as possible behind its cab to provide for more weight transfer to the front axle and to minimize the overall length of the mixer. The drum is driven from a power unit, usually in the form of a hydraulic motor, connected to a reduction transmission carried by the mixer frame or front support and finally through a chain and sprocket drive arrangement to the drum.

The present invention provides a direct gear drive from the hydraulic motor to the drum with the usual general advantages of a gear drive as compared to a chain and sprocket drive. Furthermore, the direct gear drive, preferably of the planetary transmission gear type, according to this invention has part of the transmission disposed within the adjacent end of the drum or within the contour of that end of the drum. If a portion of the transmission is located within the drum, it is suitably guarded and protected from the abrasive contents of the drum.

The provision of the direct gear drive and disposition of part of the transmission thereof, according to this invention, within the contour of the end of the drum, preferably actually within the drum, results in important objects and advantages which may be summarized as follows:

A. A shorter overall length and positioning of the center of gravity forwardly to provide for more weight transfer to the front axle.
B. Reduction of mixer and truck frame stresses usual with a chain drive.
C. Cleaner conditions at the drum head due to the elimination of the chain drive which requires oil or grease on the chain.
D. The possibility of having the transmission mounted on the front trunnion shaft and having that shaft carried by a ball and socket joint or self-aligning bearing to permit free movement of the forward trunnion shaft and drum.

The best mode contemplated in carrying out this invention is illustrated in the accompanying drawings in which:

FIG. 3 is a view similar to FIG. 1 but showing a portion of the transmission located in a pocket recessed within the forward end of the drum.

FIG. 4 is a transverse sectional view taken along line 4—4 of FIG. 3.

Figure 1:
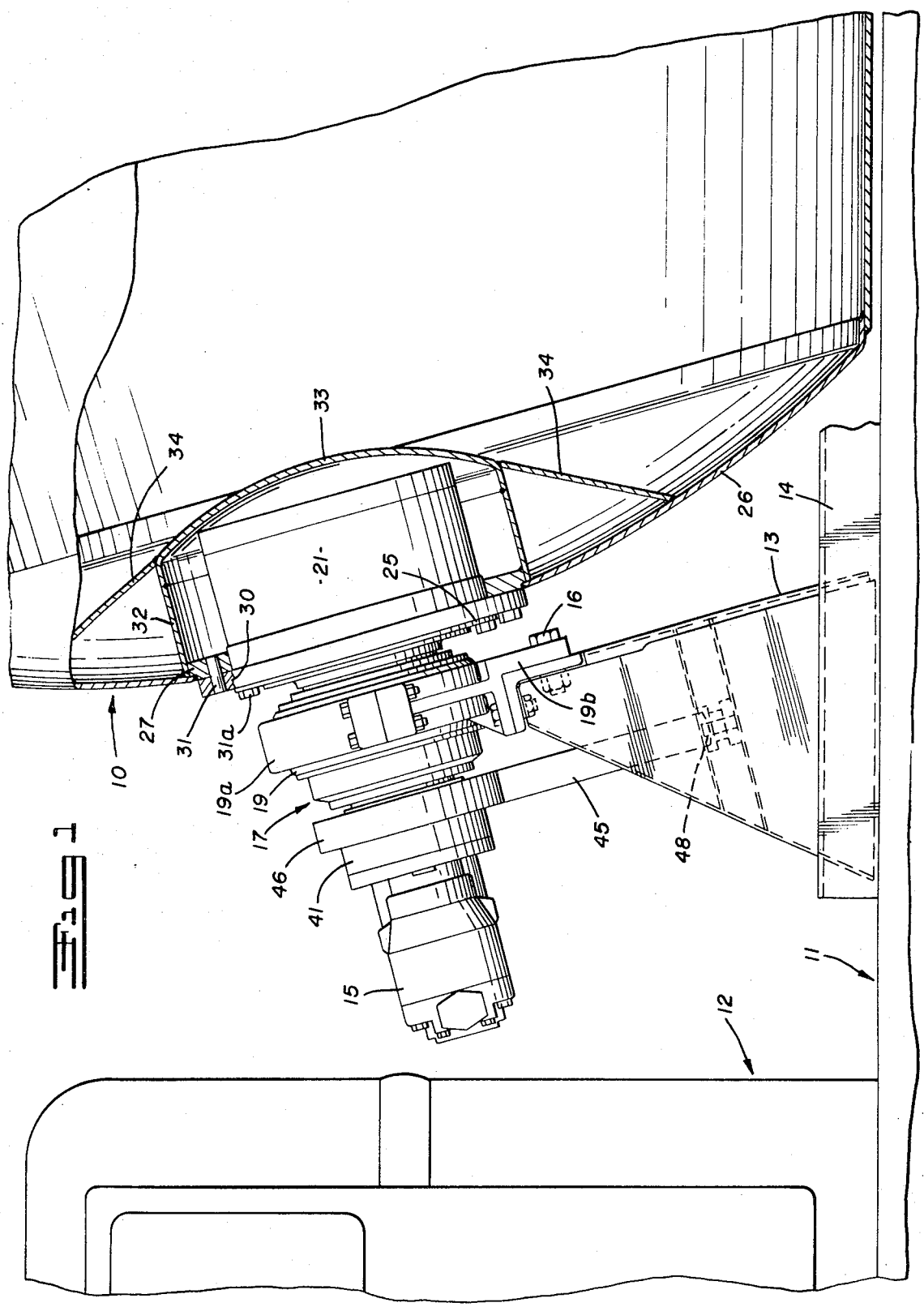
FIG. 1 is a general view, partly in side elevational and partly in section, showing the direct gear drive of this invention associated with a mixer drum with a portion of it disposed within the drum.

In the drawings, the direct gear drive is shown applied to a truck mixer of the high-dump type in which the drum rotates about an inclined axis. However, it is equally applicable to a mixer having a horizontal axis.

In the example shown there is illustrated, in FIG. 1, a mixer mounted on a truck chassis 11 of any suitable type behind the vertical rear wall 12 of the cab of the truck. It is desirable that the longitudinal extent of the space between the rear wall 12 of the cab and the forward end of the mixer drum 10 be kept at a minimum and the direct gear drive of this invention is designed and constructed so that it can be mounted in that space and part of it extended into the drum so that the center of gravity is moved forwardly and it is not necessary to extend the overall length of the truck mixer. However, as indicated above, this invention is not necessarily limited to a truck mixer. The drum 10 is mounted in a rearwardly and upwardly tilted position for rotation about its axis by means including the forward stand 13 which is upstanding from a frame 14 that is suitably attached to the chassis 11. The rear end of the mixer drum is supported rotatably by the usual drum support rollers carried by the rear stand which is not shown. The power source is the usual hydraulic motor 15 which supplies the necessary input torque to the direct gear drive unit 17 of this invention that is disposed in axially aligned relationship with the motor. As indicated, part of this unit 17 is extended into the adjacent or forward end of the mixer drum 10.

Figure 2:
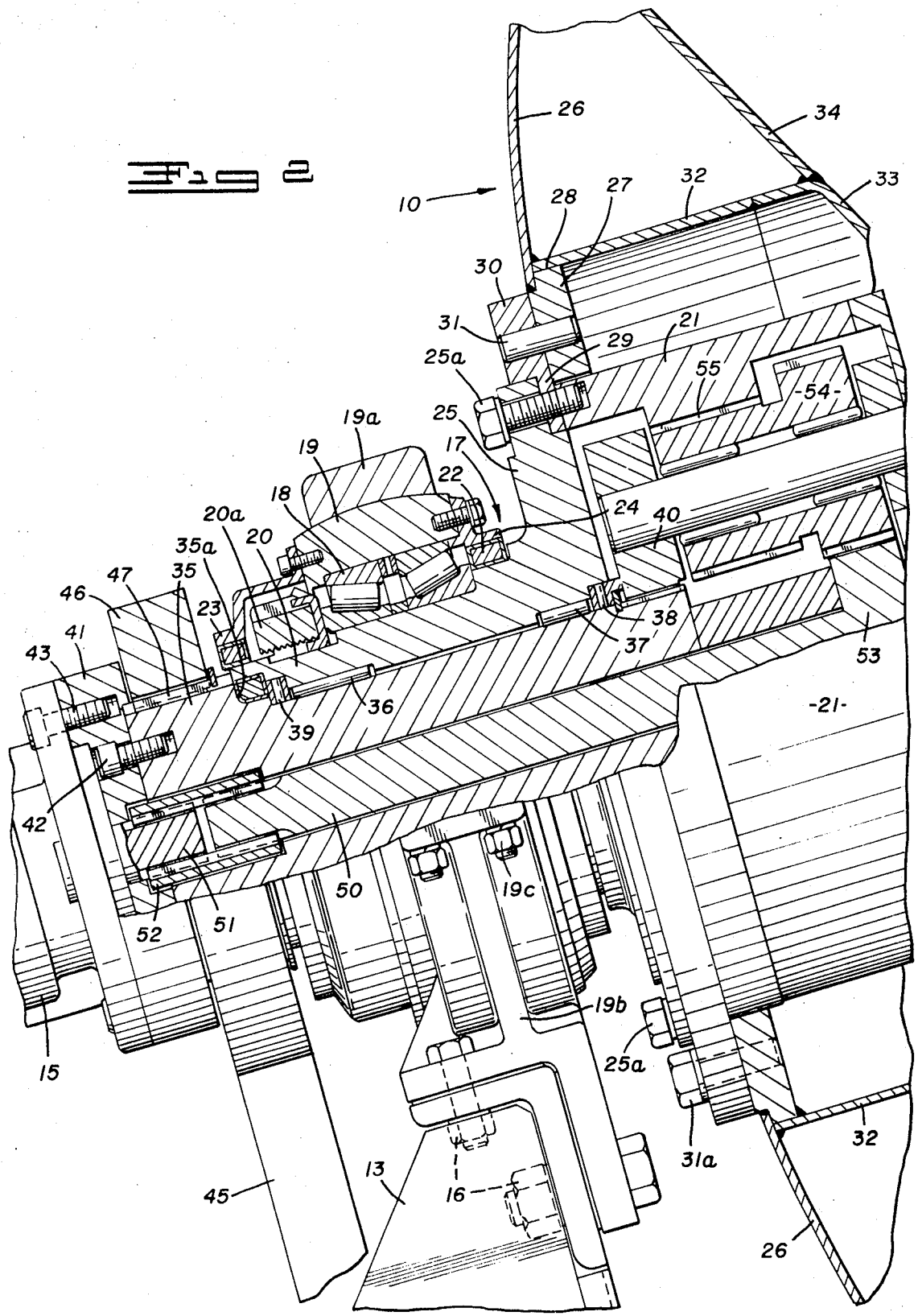
FIG. 2 is an enlarged axial sectional view through the direct gear drive and cooperating bearing support.

As shown best in FIG. 2, the unit 17 is supported by the stand 13 through a trunnion bearing assembly including trunnion bearings 18 indicated as being of the roller type. The bearing assembly includes a split housing consisting of the upper half 19a and the lower half 19b, bolted together by the bolts 19c. The lower half 19b of the bearing housing is supported by, and is rigidly bolted to, the upper end of the stand 13 by the bolts 16. Preferably the trunnion bearing assembly includes a self-aligning bearing or ball joint of the type shown which includes a ring or collar 19 having an outer spherical surface that fits for rocking movement or self alignment in the split bearing housing.

The bearings 18 surround and support the forward sleeve extension 20 attached to the cylindrical housing 21 disposed within the forward end of the mixer drum 10. At the forward end of the sleeve member 20 a bearing nut 20a is provided to hold the bearings 18 axially in position and rearwardly of the bearings 18 is a rear seal 22 surrounding the member 20. Covering the nut 20a is a ring 23 with a front seal and surrounding the rear seal 22 is a ring 24, the rings being bolted to the respective bearing housing sections 19a and 19b.

The rear end of the sleeve 20 is provided with an integral radially extending annular flange 25. This flange 25 removably fits within the forward edge of the cylindrical housing 21 and is bolted rigidly thereto by means of the clamping bolts 25a spaced angularly around the flange 25. The housing 21 encloses the gearing of a planetary gearing unit of the usual type. Since this unit is of a standard type, the planetary gearing of the unit is not disclosed in detail. The housing 21 is disposed within the forward end of the drum 10 and removably fitted into an opening formed in the front wall or head 26 of the drum co-axial therewith. Within this opening is fitted a ring 27 which is welded to the wall 26 and which is thicker than that wall so that it provides a projecting annular shoulder edge 28 within the drum. This ring 27 closely surrounds and fits the annular wall of the cylindrical or drum-like housing 21. The rear face of the flange 25 adjacent its outer edge is recessed to receive an annular inwardly directed flange 29 on a drive ring 30. The body of this ring 30 surrounds the peripheral edge of the flange 25 and fits snugly thereon. Thus, the ring flange 29 is clamped between the outer thinner edge portion of the flange 25 and the forward face of the housing 21. Drive pins 31 and additional clamping bolts 31a are fitted at angularly spaced positions into pairs of aligning openings in the respective rings 30 and 27 which are in face contact. Thus, when the planetary gear housing 21 is revolved about its axis, the mixer drum 10 is revolved therewith.

The planetary gear housing 21 is enclosed within and is covered by a pan-like cover which includes a skirt 32 that fits around the circular edge 28 of the drive ring 27 and which has its inner edge welded to the drum end wall 26. The rear wall 33 of this cover is shown of dome form and a surrounding annular wall or collar 34 is provided as a continuation thereof, its outer edge being welded to the inner surface of the mixer drum wall 26. Thus, the planetary gear housing 21 in the drum 10 is covered and protected from the contents of the drum and the arrangement is such as not to create pockets in which the contents might accumulate.

The sleeve 20 is thus rotatably mounted within the trunnion bearings 18 which, in turn, are supported by the ball and socket joint within the fixed front stand 13. This sleeve 20 surrounds another sleve 35 which may be termed the transmission reaction member. This member is mounted within the sleeve 20, so that such sleeve can rotate thereon, by means of the needle bearings 36 and 37. Surrounding the rear end of the sleeve member 35 and disposed within an annular socket in the rear end of the sleeve 20 is a thrust bearing 38 which is in engagement with a pinion-carrying ring 40 in the housing 21 that is splined to the rear end of the member 35. A thrust bearing 39 is provided at the front end of the sleeve 20 and has a seal cooperating therewith and engaging with an annular shoulder 35a formed on the member 35. The hydraulic motor 15 is mounted on the forward end of the member 35 by means of an intermediate mounting plate 41 which is bolted to that end by the bolts 42 and to an adjacent rear flange of the housing of the motor 15 by means of bolts 43.

To prevent the member 35 from rotating, due to reaction to forces in the planetary gear unit 21, means is provided for anchoring it to the fixed stand 13 or to other parts of the mixer frame. As shown, this means comprises a single torque arm 45 although a double arm could be used. The arm shown has a collar 46 at its outer end that is splined at 47 to the enlarged rear end of the member 35. The lower end of this arm 45 is suitably fixed or anchored, such as by the separable connection 48, to the stand 13. Thus, the member 35, which corresponds to the usual output shaft of a planetary gearing unit and which has the ring 40 splined thereon, is prevented from rotating.

The input shaft to the planetary gearing comprises the input or quill shaft 50. This shaft 50 is rotatable within the member 35, is disposed coaxial with the drive shaft of the motor 15, and is connected thereto by an adapter shaft 51, disposed axially between the two shafts, and splined thereto by a spline arrangement 52. Thus, the motor 15 drives the planetary gearing through the input shaft 50, it being noted that this shaft extends into the housing 21 and carries the drive pinion 53 of the gearing. This pinion drives the usual planetary gearing which includes the stepped pinions 54 carried by the ring 40 and the ring gear 55 on the wall of the housing 21. Since the member 35 is prevented from rotating about its axis, the housing 21 will be revolved about its axis and drive the mixer drum 10.

It will be apparent that this arrangement provides a trunnion bearing assembly for rotatably supporting the front end of the drum by means of a trunnion shaft which is supported by a bearing that permits rocking of the axis of the shaft in accordance with such movement of the drum axis. Also, it provides a direct gear drive transmission assembly for driving the drum. The entire assembly of bearing and drive transmission is disposed co-axial with the drum, with part of it located within the drum so as to keep to a minimum the longitudinal extent of the space between the truck cab and the forward end of the drum. The part of the assembly within the drum is protected from its contents as indicated. All parts are readily accessible for service or replacement. It will be apparent that the motor 15 can be readily removed by removing the bolts 43. The torque arm 45 may be removed after removal of the motor by removing bolts 42 to permit removal of the plate 41, and after disconnecting the arm at 48. The bearing assembly may be separated by removing the bolts 19c, and its lower part 19 b may be removed from the stand 13 by removing the bolts 16. The member 20 and parts which it carries, can be separated from the drum 10 and the housing 21 by removing the bolts 25a, to permit the housing 21 to stay in place, or the housing may be removed with the member 25 from the drum by only removing the bolts 31a and not the bolts 25a.

In FIGS. 3 and 4, there is illustrated an embodiment of this invention in which the planetary gear housing 21 rather than being within the mixer drum 10a itself is within a pocket 60 recessed within the contour of the end wall or head 26a of the drum. The pocket is annular and the housing 21 is disposed concentrically therein. To secure the housing 21 in the pocket 60, gussets 61 are provided at angularly spaced positions about the housing and extend radially between the wall of the pocket and the mounting ring 27a. The outer ends of these gussets are welded to the pocket wall and their inner ends support a ring 27a welded thereto. The ring 30 is attached by the bolts 31a to the ring 27a. The flange 25 is attached by the bolts 25a to the ring 30 and the housing 21. The remainder of the assembly forwardly of the flange 25 is the same as in the previous example.

This arrangement will function substantially the same as the assembly previously described and will have substantially the same advantages. In each case, part of the transmission, specifically the planetary gear housing, is disposed within the contour of the front wall or head of the drum. This bearing assembly and direct drive arrangement for the drum makes it possible to eliminate the usual chain drive for the drum with its attendant disadvantages of mixer and truck frame stresses and grease bearing parts. One of the main advantages is that the positioning of the planetary transmission gear housing within the contour of the drum head, permits the moving of the center of gravity farther forwardly to provide for more weight transfer to the front axle and for shorter overall length of the mixer.

Thus, a direct gear drive and trunnion bearing assembly is provided which has the many advantages indicated and has other advantages which will be obvious.

Having thus described the invention what is claimed is:

1. In combination with a drum or the like with opposed ends of selected contour and a longitudinal axis and means for mounting the drum for rotation about the axis including a support in the form of a stand:

a bearing assembly on the stand for rotatably mounting an adjacent end of the drum at the axis of the drum;

a direct gear drive for the drum including a gear transmission unit supported by the bearing assembly and disposed co-axially of the drum;

said gear transmission unit having its axis extending longitudinally relative to the adjacent end of the drum so that a portion of the unit is disposed within the contour of the said end of the drum;

said transmission unit including a planetary gear system disposed within a housing;

said housing being mounted within the contour of the drum end concentric with the axis thereof;

and a driving connection between said housing and the end of the drum.

2. The combination of claim 1 including:

a drive motor disposed co-axial with the transmission unit and extending outwardly therefrom;

an input shaft extending from the drive motor into said planetary gear housing;

a reaction member extending from said housing outwardly toward the motor; and means for anchoring said reaction member to prevent rotation thereof.

3. The combination of claim 2 in which:

said housing has a support sleeve non-rotatably secured thereto and extending outwardly at the end of the drum co-axial therewith;

said sleeve being rotatably supported by the bearing assembly which is of the trunnion type;

said reaction member is in the form of a sleeve which is concentric with and rotatably receives said input shaft and extends outwardly from the drum end; and said reaction member anchoring means comprises at least one torque arm anchored to a non-rotatable support and has a collar surrounding said member and keyed thereto.

4. The combination of claim 3 in which:

said bearing assembly includes a spherical support and a complemental socket member providing a ball and socket joint to permit rocking of the inpur shaft relative to its axis.

5. The combination of claim 3 in which:

said drive motor is in the form of a hydraulic motor co-axially mounted on said reaction sleeve member at its outer end and has its drive shaft axially aligned with and connected to said input shaft.

6. The combination of claim 3 in which:

the bearing assembly comprises separable parts, one of which is removably mounted on said stand;

said torque bar is removably attached to the support and to the reaction sleeve member; and said motor is removably mounted on the outer end of said reaction sleeve member.

7. The combination of claim 2 in which:

said driving connection between said planetary gear housing and the adjacent end of the drum comprises a support ring of annular form surrounding an opening in said drum end and being fixed to said drum end;

said housing removably fitting in said ring;

said support sleeve has an inner flange in cooperation with said housing;

means is provided for securing the flange to the housing; and means is provided for securing the flange to the support ring and comprises;

an intermediate ring connected to said support ring and to said flange.

8. The combination of claim 7 in which:

said intermediate ring is in contact with said support ring;

a driving connection is provided between said rings; and a driving connection is provided between said flange and said intermediate ring.

9. The combination of claim 8 including:

an additional driving connection between said flange and said housing.

10. The combination of claim 9 in which:

all of said driving connections are separable. which:

11. The combination of claim 9 in which:

said planetary gear housing is of cylindrical form and projects axially inwardly from the end of said drum and concentrically fits within said support ring attached to the end of the drum; and a pan-like cover for said housing is provided and has a skirt extending outwardly to the end of the drum and around said support ring.

12. The combination of claim 11 in which:

said cover has an inner wall of dome form; and a guard collar surrounds said cover to form a continuation of said inner wall and is secured to said cover and said drum end.

13. The combination of claim 1 in which said end of the drum has an exterior pocket within the contour of said end and:

said portion of the transmission unit includes a housing enclosing a planetary gear unit;

said housing being of cylindrical form; and means for concentrically supporting said housing within the pocket and connecting the housing and drum together for rotation.

14. The combination of claim 13 in which:

said supporting means comprises means extending between said housing and the wall of the pocket and connected thereto.

15. The combination of claim 1 in which said portion of the transmission unit is disposed within the interior of the drum axially inwardly of said end.

16. The combination of claim 1 in which said end of the drum has an exterior pocket within the contour of said end, and said portion of the transmission unit extends into said pocket.

* * * * *

Disclaimer and Dedication

3,754,737.—*John A. O'Dea*, Columbus, Ohio. DIRECT GEAR DRIVE FOR TRUCK MIXER DRUM. Patent dated Aug. 28, 1973. Disclaimer and dedication filed May 15, 1977, by the assignee, *Fairfield Manufacturing Company, Inc.*

Hereby disclaims and dedicates to the Public claims 1-16 of said patent.

[*Official Gazette August 30, 1977.*]